F. HORR.
RESILIENT TIRE.
APPLICATION FILED JAN. 19, 1915.
1,147,094.
Patented July 20, 1915.
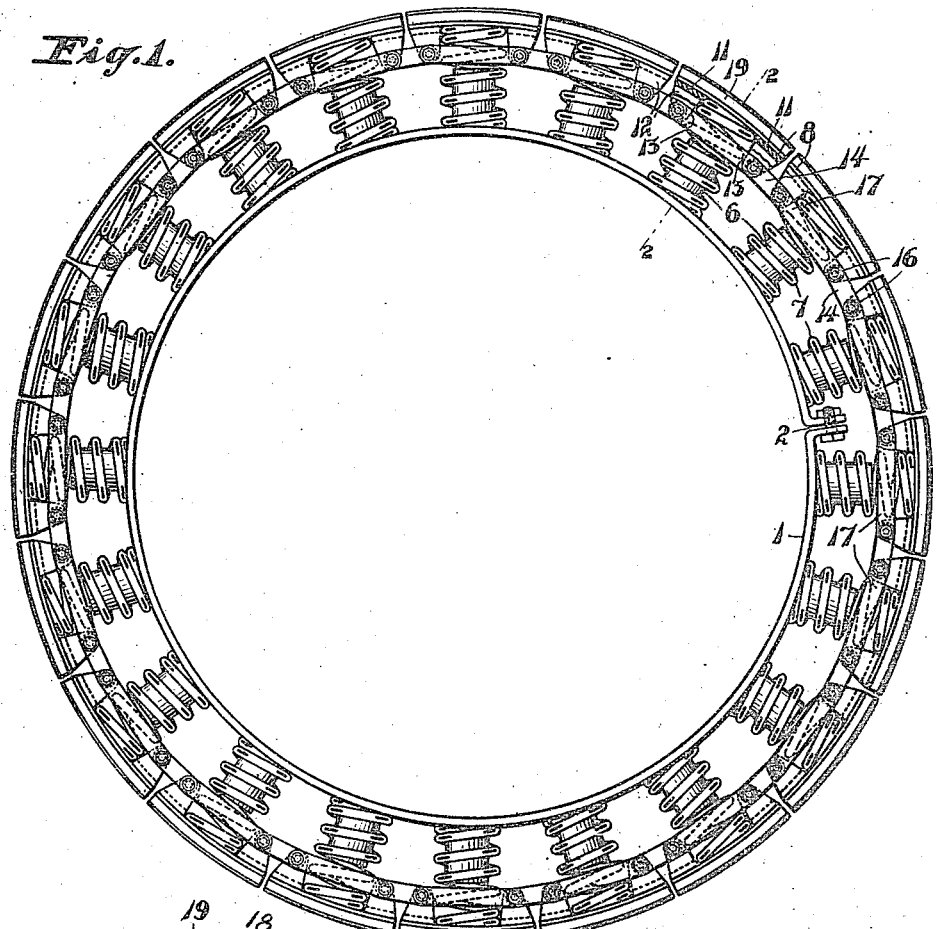
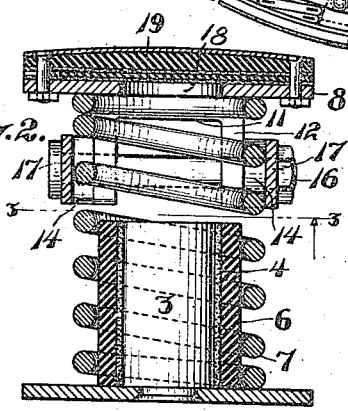
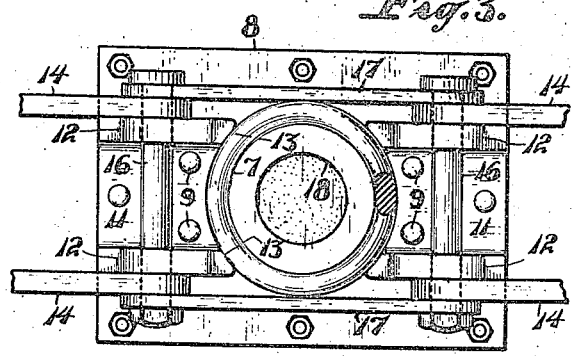
WITNESSES:
INVENTOR,
Frank Horr,
BY
ATTORNEY

UNITED STATES PATENT OFFICE.

FRANK HORR, OF BIEBER, CALIFORNIA.

RESILIENT TIRE.

1,147,094.  Specification of Letters Patent. Patented July 20, 1915.

Application filed January 19, 1915. Serial No. 3,041.

*To all whom it may concern:*

Be it known that I, FRANK HORR, a citizen of the United States, residing at Bieber, in the county of Lassen and State of California, have invented new and useful Improvements in Resilient Tires, of which the following is a specification.

The object of my invention is to provide a resilient tire adapted to be applied to all kinds of vehicle wheels, and especially intended for automobile wheels, which will dispense with the use of pneumatic tires and thereby avoid accidents due to punctures, blow-outs and the like, which will be resilient both radially and laterally, or in a direction parallel with the axis of the wheel and from which any mud or small rocks which become lodged therein will be immediately discharged as the wheel turns.

My invention also consists in the novel construction, combination and arrangement of parts hereinafter more fully specified and particularly pointed out in the claim.

In the accompanying drawing, Figure 1 is a side view of my improved resilient tire; Fig. 2 is an enlarged detail sectional view on the line 2—2 of Fig. 1; Fig. 3 is an enlarged cross sectional view on the line 3—3 of Fig. 2.

Referring to the drawings, 1 indicates a band, formed with outwardly turned ends 2, which can be bolted together to secure the band around the rim of a wheel. From said band extend radially outward at suitable intervals short fixed metallic rods or pins 3, surrounding each of which is a tube 4 of compressed fiber, around which tube is a tube 6 of soft rubber. Surrounding each soft rubber tube 6 is the inner portion of a helical spring 7, the outer portion of which extends beyond the tubes 5 and 6 and the rod 4, and is seated against the central portion of an oblong rectangular metallic shoe 8. To each end of said shoe 8 is riveted, as shown at 9, the central portion of a plate 11, the terminal portions 12 of which are bent at right angles to said shoe and central portion of the plate and serve as lugs extending inwardly from the shoe. The inner edges of these lugs 12 are employed to center the outer end of the helical spring with reference to the shoe, and therefore the inner ends of said lugs are beveled at their inner edges, as shown at 13, so that the surfaces of said inner ends are substantially tangential to the helical spring. Moreover, said inner edges do not extend exactly at right angles to said shoe, but incline slightly outwardly from the spring, so that while the lower portions of the inner edges of the lugs, next to the shoe, are in contact, or substantially in contact, with the outermost coil of the spring, the upper portions of said inner edges do not contact with the spring, and hence the portions of the spring out of contact with the shoe are free to bend, or move in a direction transverse to the axis of the spring. The adjacent pairs of lugs of each pair of adjacent shoes are connected together by links 14, bolts 16 passing through registering holes in said links and lugs. These links are of a length such that the shoes are spaced from one another a sufficient distance to permit free movement of said shoes with reference to the band. There are also bolted to said lugs, by means of the bolts 16, outside the links 14, bars 17, which not only serve to retain the links in place and take some of the strain from off the lugs, but insure the coiled springs being retained in their central positions between said lugs. Each shoe has a central aperture 18 of sufficient size to receive the end of the adjacent rod 3 in case the spring 7 is compressed to such a degree that the end of the rod would otherwise abut against the inner surface of the shoe. To the outer side of each shoe is secured in any desired manner a tread section 19 of rubber or other suitable material.

It will readily be seen from the above description that my improved tire is resilient in a direction through the axis of the wheel, in a circumferential direction of the wheel, and laterally thereof. It is important that the tire of the wheel should be able to yield resiliently in a lateral direction in turning corners, and many prior substitutes for pneumatic tires have failed because they did not have this property of the pneumatic tire for which they were intended to be a substitute. It will also be seen that by reason of this construction any mud or small rocks which become lodged in the tire are immediately discharged through the spaces between successive shoes and also between the shoes and the links by reason of the compression of the tire in the turning of the wheel.

I claim:—

In combination, a band adapted to be secured around the rim of a wheel, a circumferential series of rods extending radially outward from said band at suitable intervals and rigidly secured thereto, a helical spring around each rod, the inner end resting against said band and the outer portion projecting beyond the rod, a circumferential series of shoes, spaced from each other, each bearing against the outer end of the helical spring and having a central recess sufficiently wide to receive the outer end of the adjacent rod, pairs of lugs extending inwardly from the shoe substantially in contact with the outer coil of the helical spring, the inner edges of said lugs being tangential to said coil, and devices flexibly connecting the lugs of adjacent shoes.

In testimony whereof I have hereunto set my hand in the presence of two subscribing witnesses.

FRANK HORR.

Witnesses:
F. M. WRIGHT,
D. B. RICHARDS.

Copies of this patent may be obtained for five cents each, by addressing the "Commissioner of Patents, Washington, D. C."